(12) United States Patent
Kabalnov et al.

(10) Patent No.: US 11,384,248 B2
(45) Date of Patent: Jul. 12, 2022

(54) INFRARED ABSORBING NANOPARTICLE(S)

(71) Applicant: HEWLETT-PACKARD DEVELOPMENT COMPANY, L.P., Houston, TX (US)

(72) Inventors: Alexey S Kabalnov, San Diego, CA (US); Daniel Tanchangco, San Diego, CA (US); Stephen G. Rudisill, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1003 days.

(21) Appl. No.: 16/077,776

(22) PCT Filed: Mar. 23, 2017

(86) PCT No.: PCT/US2017/023835
§ 371 (c)(1),
(2) Date: Aug. 14, 2018

(87) PCT Pub. No.: WO2018/174890
PCT Pub. Date: Sep. 27, 2018

(65) Prior Publication Data
US 2021/0198501 A1 Jul. 1, 2021

(51) Int. Cl.
*C09D 11/03* (2014.01)
*B33Y 70/00* (2020.01)
(Continued)

(52) U.S. Cl.
CPC .............. *C09D 11/03* (2013.01); *B33Y 70/00* (2014.12); *C01D 17/00* (2013.01); *C01G 41/02* (2013.01);
(Continued)

(58) Field of Classification Search
CPC ..... C09D 11/03; C09D 11/037; C09D 11/322; C09D 11/033; C09D 11/328; B33Y 70/00;
(Continued)

(56) References Cited

U.S. PATENT DOCUMENTS 5,204,055 A 4/1993 Sachs et al.
7,972,426 B2 7/2011 Hinch et al.
(Continued)

FOREIGN PATENT DOCUMENTS

WO 2015015200 A1 2/2015

OTHER PUBLICATIONS

Lee, "Self-Assembly and Nanotechnology: A Force Balance Approach", John Wiley & Sons, Inc., 2008, 30 pages.
(Continued)

*Primary Examiner* — Andrew J. Oyer
(74) *Attorney, Agent, or Firm* — HPI Patent Department

(57) ABSTRACT

A nanoparticle used in 3D printing is disclosed herein. In an example, the nanoparticle can comprise: at least one metal oxide, which absorbs infrared light in a range of from about 780 nm to about 2300 nm and is shown in formula (1):

$$M_m M'O_n \qquad (1)$$

wherein M is an alkali metal, m is greater than 0 and less than 1, M' is any metal, and n is greater than 0 and less than or equal to 4; and a bilayer-forming surfactant encapsulating at least a portion of the metal oxide, wherein the nanoparticle has a diameter of from about 0.1 nm to about 500 nm.

11 Claims, 2 Drawing Sheets

(51) Int. Cl.
- C01G 41/02 (2006.01)
- C07F 9/10 (2006.01)
- C09D 11/037 (2014.01)
- C01D 17/00 (2006.01)
- B82Y 30/00 (2011.01)
- B82Y 40/00 (2011.01)

(52) U.S. Cl.
CPC .............. *C07F 9/10* (2013.01); *C09D 11/037* (2013.01); *B82Y 30/00* (2013.01); *B82Y 40/00* (2013.01); *C01P 2004/62* (2013.01); *C01P 2004/64* (2013.01); *C01P 2006/60* (2013.01)

(58) Field of Classification Search
CPC ........... C01D 17/00; C01G 41/02; C07F 9/10; B82Y 30/00; B82Y 40/00; C01P 2004/62; C01P 2004/64; C01P 2006/60
See application file for complete search history.

(56) References Cited

U.S. PATENT DOCUMENTS

| | | | |
|---|---|---|---|
| 8,232,418 B1* | 7/2012 | Bilbie | C07F 9/103 554/83 |
| 8,651,390 B2 | 2/2014 | Hinch et al. | |
| 9,643,359 B2 | 5/2017 | Baumann et al. | |
| 2005/0126434 A1* | 6/2005 | Feldkamp | C09D 11/38 106/31.43 |
| 2007/0238056 A1 | 10/2007 | Baumann et al. | |
| 2012/0092427 A1* | 4/2012 | Ganapathiappan | B41J 2/2107 347/101 |
| 2016/0168407 A1* | 6/2016 | Jarvis | B41M 5/30 424/443 |
| 2020/0170150 A1* | 5/2020 | Okada | B32B 7/023 |

OTHER PUBLICATIONS

Faraday, Michael. "X. The Bakerian Lecture.—Experimental relations of gold (and other metals) to light." Philosophical Transactions of the Royal Society of London 147 (1857): 145-181.

Garcia, Guillermo, et al. "Dynamically modulating, the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences." (2014): 3240-3253.

Kanehara, Masayuki, et al. "Indium tin oxide nanoparticles with compositionally tunable surface plasmon . . . " Jrnl of the Amer Chem Society 131.49, 200,: 17736-17737.

Milligan, W. O., and R. H. Morriss. "Morphology of Colloidal Gold—A Comparative Study." Journal of the American Chemical Society 86.17 (1964): 3461-3467.

Usui, Hiroyuki, Takeshi Sasaki, and Naoto Koshizaki. "Optical transmittance of indium tin oxide nanoparticles prepared by laser-induced fragmentation in water." The Journal of Physical Chemistry B 110.26 (2006): 12890-12895.

Van der Zande, Bianca MI, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", 10 pages, The Rice Institute, Houston, TX.

* cited by examiner

INFRARED ABSORBING NANOPARTICLE(S)

BACKGROUND

Three-dimensional (3D) printing can be an additive printing process used to make three-dimensional object(s) or part(s) from a digital model. 3D printing is often used in rapid product prototyping, mold generation, and mold master generation. Some 3D printing techniques are considered additive processes because they involve the application of successive layers of material. This is unlike machining processes, which tend to rely upon the removal of material to create the final part.

Materials used in 3D printing tend to need curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
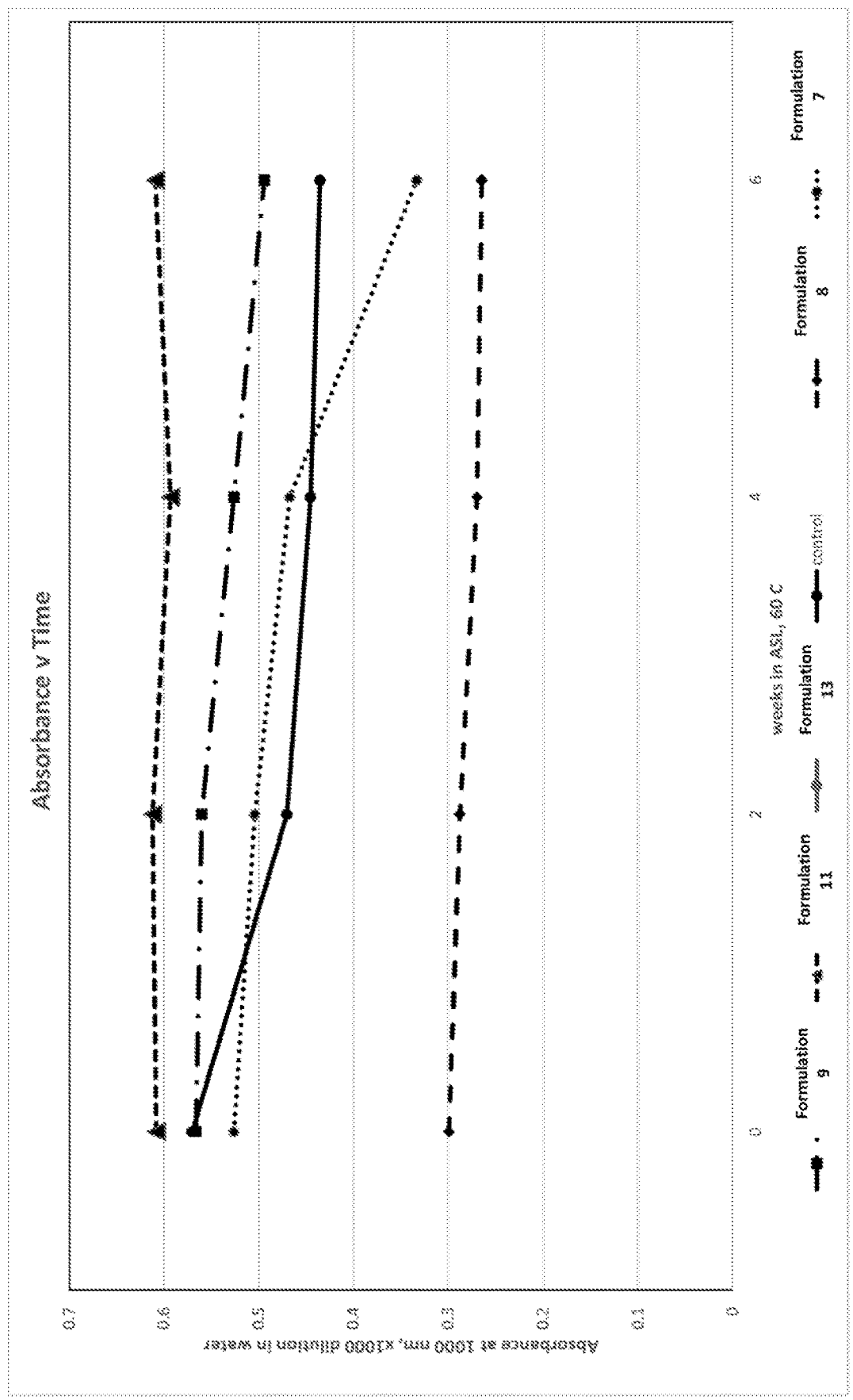
FIG. 1 is a graph showing changes in absorbance at 1000 nm over a period of 6 weeks (Accelerated Shelf Life—ASL) for six different formulations.

Examples of the three-dimensional (3D) printing method disclosed herein utilize Multi Jet Fusion Printing (MJFP). During MJFP, a layer of a build material (also referred to as build material particles) is exposed to radiation, but a selected region (in some instances less than the entire layer) of the build material is fused and hardened to become a layer of a 3D part(s) or object(s).

In the examples disclosed herein, a fusing agent (e.g., nanoparticles described herein) can be selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent (e.g., nanoparticles). This causes the build material to fuse, bind, or cure, to form the layer of the 3D part(s) or object(s).

In some examples, the fusing agent(s) or nanoparticles used to fuse the build material(s) can include colorant(s). These colorant(s) can be visible and/or optically transparent. Optically transparent colorant(s) can include colorant(s) that absorb light outside the visible spectrum (e.g., about 390 nm to about 700 nm).

Inorganic infrared (IR) absorbing pigments tend to gradually degrade over time with a reduction in IR absorbance. Without wishing to be bound by theory, it is believed that reduction in IR absorbance in inorganic pigments can occur because of ion exchange in the aqueous medium of 3D printing. Without wishing to be bound by theory, it is further believed that leaching of water-soluble ions from the IR absorbing inorganic pigments into water during the ion exchange, which causes degradation of IR absorbing inorganic pigments.

There is, therefore, a need for IR absorbing inorganic pigments in 3D printing that exhibit IR absorbance stability and inorganic pigment particle size stability over a period of time.

In examples described herein, nanoparticles comprising IR absorbing metal oxides and bilayer-forming surfactant are disclosed. These nanoparticles can exhibit improved particle size stability and IR absorbance stability over time when compared with nanoparticles comprising IR absorbing metal oxides sans bilayer-forming surfactants.

Examples described herein further show that the nanoparticles comprising IR absorbing metal oxides, bilayer-forming surfactant, and a buffer solution can exhibit improved particle size stability and IR absorbance stability over time when compared with nanoparticles comprising R absorbing metal oxides sans bilayer-forming surfactants and buffer solutions.

Nanoparticle(s)

In some examples, described herein is a nanoparticle comprising: at least one metal oxide, which absorbs infrared light in a range of from about 780 nm to about 2300 nm and is shown in formula (1):

$$M_m M'O_n \qquad (1)$$

wherein M is an alkali metal, m is greater than 0 and less than 1, M' is any metal, and n is greater than 0 and less than or equal to 4; and a bilayer-forming surfactant encapsulating at least a portion of the metal oxide, wherein the nanoparticle has a diameter of from about 0.1 nm to about 500 nm.

In some examples, a nanoparticle can comprise at least one metal oxide and a bilayer-forming surfactant encapsulating at least a portion of the metal oxide.

The metal oxide can be an IR absorbing inorganic nanoparticle. In some examples, the metal oxide can absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm.

In some examples, the metal oxide can be defined as shown in formula (1) below:

$$M_m M'O_n \qquad (1)$$

M in formula (1) above can be an alkali metal. In some examples, M can be lithium (Li), sodium (Na), potassium (K), rubidium (Rio), cesium (Cs), or mixtures thereof. In some examples, M can be cesium (Cs).

m in formula (1) above can be greater than 0 and less than 1. In some examples, m can be 0.33.

M' in formula (1) above can be any metal. In some examples, M' can be tungsten (W), molybdenum (Mb), tantalum (Ta), hafnium (Hf), cerium (Ca), lanthanum (La), or mixtures thereof. In some examples, M' can be tungsten (W).

n in formula (1) above can be greater than 0 and less than or equal to 4. In some examples, n in formula (1) above can be greater than 0 and less than or equal to 3.

In some examples, the nanoparticle can have a diameter of from about 0.1 nm to about 500 nm, or from about 0.5 nm to about 400 nm, or from about 0.6 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 4 nm to about 40 nm.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm.

In some examples, the bilayer-forming surfactant makes up the difference in size between the nanoparticle and the metal oxide particles.

In some examples, the metal oxide is present in the nanoparticle in an amount ranging from about 40 wt % to about 99 wt % based on the total weight of the nanoparticle, or from about 50 wt % to about 95 wt % based on the total weight of the nanoparticle, or from about 60 wt % to about 90 wt % based on the total weight of the nanoparticle, or from about 70 wt % to about 90 wt % based on the total weight of the nanoparticle. The bilayer-forming surfactant is the balance of the nanoparticle.

Bilayer-Forming Surfactant(s)

In some examples, the bilayer-forming surfactant can be a bilayer-forming cationic surfactant, a bilayer-forming anionic surfactant, a bilayer-forming amphiphilic surfactant, a bilayer-forming zwitterionic surfactant, or mixtures thereof.

In same examples, the bilayer-forming amphiphilic surfactant is an amphiphilic lipid, which is a phospholipid selected from the group consisting of saturated phospholipids, unsaturated phospholipids, synthetic phospholipids, natural phospholipids, and combinations thereof.

In some examples, the phospholipid is selected from the group consisting of natural and synthetic lipids, hen egg-derived phospholipid, egg phospholipid, purified egg phospholipid, soy phospholipid, dimyristoyl lecithin, didodecanoyl lecithin, dioeoyl lecithin, dilinceoyl lecithin, α-palmito-β-oleoyl lecithin, α-palmitoyl-β-linoleoyl lecithin, α-aleoyl-β-palmitoyl lecithin, diarachidanyl lecithin, α-palmito-β-myristoyl lecithin, dimyristoyl phosphatidic acid, dipalmitoyl phosphatidic acid, distearoyl phosphatidic acid, phosphatidyl serine, phosphatidyl inositol, dimyristoyl phosphatidyl glycerol, dipalmitoyl phosphatidyl glycerol, dioctadecanoyl phosphatidyl ethanolamine, dioleoyl phosphatidyl ethanolamine, dihexadecyl phosphatidyl ethanolamine, dilauryl phosphatidyl ethanolamine, dimyristoyl phosphatidyl ethanolamine, dipalmitoyl phosphatidyl ethanolamine, Lipoid E80, Lipoid ES, Lipoid 90H, Lipoid 100H, and combinations thereof.

In some examples, the bilayer-forming anionic surfactant can be a mono- or di-ester of phosphoric acid and aliphatic alcohols, or combinations thereof.

In some examples, the phosphate ester can be selected from the group consisting of CRODAFOS® (from Croda) phosphate esters, HORDAPHOS® (from Clariant Int, Ltd) phosphate esters, HOSTAPHAT® (from Clariant Int. Ltd.) phosphate esters, ZELEC® (from Stepan) phosphate esters, and combinations thereof.

In some examples, the phosphate ester can be HOSTAPHAT® 1322 or ZELEC® NK.

In some examples, the bilayer-forming surfactant can be soy phospholipid, a mono- or di-ester of phosphoric acid and aliphatic alcohols, or combinations thereof.

In some examples; the bilayer-forming surfactant is present in the nanoparticle in an amount ranging from about 1 wt % to about 60 wt % based on the total weight of the nanoparticle, or from about 5 wt % to about 50 wt % based on the total weight of the nanoparticle, or from about 10 wt % to about 40 wt % based on the total weight of the nanoparticle, or from about 10 wt % to about 30 wt % based on the total weight of the nanoparticle. The metal oxide is the balance of the nanoparticle.

Ink(s)

In some examples, an ink composition for three-dimensional printing is described herein. The ink composition can comprise: (A) water; (B) at least one co-solvent; and (C) a nanoparticle comprising: at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and a bilayer-forming surfactant encapsulating at least a portion of the metal oxide, wherein the nanoparticle has a diameter of from about 0.1 nm to about 500 nm.

In some examples, an ink composition for three-dimensional printing is described herein. The ink composition can comprise: (A) water; (B) at least one co-solvent; and (C) an encapsulated nanoparticle comprising: a core comprising at least one metal oxide, which absorbs infrared light in a range of from about 780 nm to about 2300 nm and is shown in formula (1):

$$M_mM'O_n \qquad (1)$$

wherein M is an alkali metal, m is greater than 0 and less than 1, M' is any metal, and n is greater than 0 and less than or equal to 4; and a shell at least partially encapsulating the core, wherein the shell comprises a bilayer-forming surfactant, wherein the encapsulated nanoparticle has a diameter of from about 0.1 nm to about 500 nm.

As used herein, the "nanoparticles" described herein refer to the "encapsulated nanoparticle" or the "nanoparticle" described above as component (C) in the ink composition(s).

In some examples, the ink composition described herein can further include (D) at least one buffer solution.

In some examples, the core comprising the at least one metal oxide shown in formula (1) is present in an amount of from about 1 wt % to about 15 wt % based on the total weight of the ink composition.

In some examples, the shell comprising the bilayer-forming surfactant is present in an amount of from about 1 wt % to about 15 wt % based on the total weight of the ink composition.

In some examples, in formula (1) shown above, M is cesium (Cs), m is 0.33, M' is tungsten (W), and n is greater than 0 and less than or equal to 3; and the bilayer-forming surfactant is soy phospholipid, a mono- or di-ester of phosphoric acid and aliphatic alcohols, or combinations thereof.

The ink composition described herein for three-dimensional printing using the nanoparticles described herein is interchangeably referred to herein as a nanoparticle aqueous ink composition.

In addition to the nanoparticle aqueous ink composition(s) described herein, other colored ink(s) can be used in three-dimensional printing either separately or together once or repeatedly to form three-dimensional printed object(s) or part(s). The nanoparticle aqueous ink composition and the other colored ink(s) are individually or collectively referred to as "ink(s)" herein.

In some examples, the other colored ink(s) can include a pigment, which imparts color to the build material upon application. The pigment may be a self-dispersing pigment or the soft polymer precursor may act as a suitable dispersant for dispersing the pigment throughout the composition. In some examples, the colored ink(s) can include a colorant (e.g., pigment and/or dye) having a color including white or black. Examples of colors include cyan, magenta, yellow, white, black, or mixtures thereof.

Any standard color pigments may be used, such as phthalocyanines for blue, quinacridone for magenta or red, pigment yellow for yellow, white, black, or combinations thereof. Some commercially available examples of the white colorant are available from DuPont under the tradename TI-PURE®, an example of which includes TI-PURE® R-706.

In some examples, dyes can be used. Examples include acid dyes (e.g., Acid Red 52, Acid Red 289, Acid Yellow 23, Acid Yellow 17, or combinations thereof), reactive dyes (e.g., Reactive Red 180, Reactive Black 31, or combinations thereof), and phthalocyanine dyes (e.g., Direct Blue 199 and Pro-Jet Cyan dyes available from Fujifilm Industrial Colorants).

Some examples of the colored ink(s) can include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company.

In an example, the pigment in the colored ink(s) may be present in an amount ranging from about 0.05 wt % to about 10 wt % of the total weight of the ink composition. In another example, the pigment may be present in an amount ranging from about 0.1 wt % to about 3 wt % of the total weight of the ink(s).

These colored ink(s) can be dispensed from different or same printhead(s) as those applying the nanoparticle aqueous ink composition. The ink(s) may be dispensed in a single pass or in multiple passes of the printheads.

Co-Solvent(s)

The ink(s) can also include a co-solvent. The co-solvent can be present in an amount ranging from about 0.1 wt % to about 20 wt % based on the total weight of the ink(s).

Some examples of co-solvents can include 2-pyrrolidinone, hydroxyethyl-2-pyrrolidone, diethylene glycol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanedial, 2-hydroxyethyl pyrrolidinone, 2-hydroxyethyl-2-pyrrolidinone, 1,6-hexanediol, and combinations thereof.

Encapsulated Nanoparticle(s)

In some examples, an encapsulated nanoparticle can comprise a core comprising at least one metal oxide and a shell at least partially encapsulating the core, wherein the shell can comprise a bilayer-forming surfactant.

The metal oxide can be an IR absorbing inorganic nanoparticle. In some examples, the metal oxide can absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm.

In some examples, the metal oxide can be defined as shown in formula (1) below:

$$M_m M'O_n \quad (1).$$

M in formula (1) above can be an alkali metal. In some examples, M can be lithium (Li), sodium (Na), potassium (K), rubidium (Rb), cesium (Cs), or mixtures thereof. In some examples, M can be cesium (Cs).

m in formula (1) above can be greater than 0 and less than 1. In some examples, m can be 0.33.

M' in formula (1) above can be any metal. In some examples, M' can be tungsten (W), molybdenum (Mb), tantalum (Ta), hafnium (Hf), cerium (Ce), lanthanum (La), or mixtures thereof. In some examples, M' can be tungsten (W).

n in formula (1) above can be greater than 0 and less than or equal to 4. In some examples, n in formula (1) above can be greater than 0 and less than or equal to 3.

In some examples, the encapsulated nanoparticle can have a diameter of from about 0.1 nm to about 500 nm, or from about 0.5 nm to about 400 nm, or from about 0.6 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 4 nm to about 40 nm.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm.

In some examples, the bilayer-forming surfactant can make up the difference in size between the nanoparticle and the metal oxide particles.

In some examples, the bilayer-forming surfactant shell, which at least partially encapsulates the core comprising at least one metal oxide encapsulates at least 10% of the core surface area, or at least 15% of the core surface area, or at least 20% of the core surface area, or at least 25% of the core surface area, or at least 30% of the core surface area, or at least 35% of the core surface area, or at least 40% of the core surface area, or at least 45% of the core surface area, or at least 50% of the core surface area, or at least 55% of the core surface area, or at least 60% of the core surface area, or at least 65% of the core surface area, or at least 70% of the core surface area, or at least 75% of the core surface area, or at least 80% of the core surface area, or at least 85% of the core surface area, or at least 90% of the core surface area, or at least 95% of the core surface area, or at least 96% of the core surface area, or at least 97% of the core surface area, or at least 98% of the core surface area, or at least 99% of the core surface area, or at least 99.5% of the core surface area, or 100% of the core surface area.

In some examples, the core comprising the at least one metal oxide shown in formula (1) is present in an amount of from about 1 wt % to about 15 wt % based on the total weight of the ink composition.

In some examples, the shell comprising the bilayer-forming surfactant is present in an amount of from about 1 wt % to about 15 wt % based on the total weight of the ink composition.

As used herein, encapsulated nanoparticle and nanoparticle are used interchangeably.

Water

The balance of the ink(s) is water. As such, the amount of water may vary depending upon the amounts of the nanoparticle(s), colorant(s), dispersant(s), co-solvent(s), and buffer solution(s), and in some instances anti-kogation agent(s), the additive dispersant(s), the acrylic latex binder(s), and/or the biocide(s) that are included.

In some examples, water can be present in the ink(s) in amounts greater than about 50 wt % based on the total weight of the ink(s). In some examples, the water can be present in the ink(s) in amounts from about 50 wt % to about 90 wt % based on the total weight of the ink(s). In other examples, the ink(s) can include from about 60 wt % to about 88 wt % water. In further examples, the ink(s) can include from about 70 wt % to about 85 wt % water.

Buffer Solution(s)

In some examples, the ink(s) may further include buffer solution(s). In some examples, the buffer solution(s) can withstand small changes (e.g., less than 1) in pH when small quantities of a water soluble acid or a water soluble base are added to a composition containing the buffer solution(s). The buffer solution(s) can have pH ranges from about 5 to about 9.5, or from about 7 to about 9, or from about 7.5 to about 8.5.

In some examples, the buffer solution(s) can be added to the ink(s) in amounts ranging from about 0.01 wt % to about 20 wt %, or from 0.1 wt % to about 15 wt %, or from about 0.1 wt % to about 10 wt % based on the total weight of the ink(s).

In some examples, the buffer solution(s) can include at least one poly-hydroxy functional amine.

In some examples, the buffer solution(s) can be 2-[4-(2-hydroxyethyl) piperazin-1-yl] ethane sulfonic acid, 2-amino-2-(hydroxymethyl)-1,3-propanediol (TRIZMA® sold by Sigma-Aldrich), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof.

In some examples, the buffer solution(s) can be 2-amino-2-(hydroxymethyl)-1,3-propanediol (TRIZMA® sold by Sigma-Aldrich), beta-alanine, betaine, or mixtures thereof.

Ink(s) Additive(s)

In some examples, the ink(s) may further include a dispersant, an anti-kogation agent, a dispersing additive, a biocide, an acrylic latex binder, and combinations thereof.

The ink(s) in some examples can be dispersed with a dispersing additive. The dispersing additive can help to uniformly distribute the colorant(s) throughout the ink(s). The dispersing additive may also aid in the wetting of the ink(s) onto any other applied ink(s) and/or the layer(s) of the build material.

The dispersing additive may be present in the ink(s) in an amount ranging from about 0.01 wt % to about 0.8 wt % based on the total weight of the colorant.

Some examples of the dispersing additive can include a water soluble acrylic acid polymer (e.g., CARBOSPERSE® K7028 available from Lubrizol), a high molecular weight block copolymer with pigment affinic groups (e.g., DISPERBYK®-190 available BYK Additives and Instruments), and combinations thereof.

The ink(s) can further include the dispersant to provide particular wetting properties when applied to the layer(s) of the build material. The dispersant can help uniformly distribute the ink(s) on the layer(s) of the build material.

The dispersant may range from about 0.1 wt % to about 5 wt % based on the total weight of the colorant in the ink(s).

The dispersant may be non-ionic, cationic, anionic, or combinations thereof. Some examples of the dispersant include a self-emulsifiable, non-ionic wetting agent based on acetylenic diol chemistry (e.g., SURFYNOL® SEF from Air Products and Chemicals. Inc.), an ethoxylated low-foam wetting agent (e.g., SURFYNOL® 440 and SURFYNOL® 465 from Air Products and Chemicals, Inc.), a non-ionic acetylenic diol surface active agent (e.g., SURFYNOL® 104 from Air Products and Chemicals, Inc.), a non-ionic, alkylphenylethoxylate and solvent free surfactant blend (e.g., SURFYNOL® CT-211 from Air Products and Chemicals, Inc.), a non-ionic organic surfactant (e.g., TEGO® Wet 510 from Evonik Industries AG), a non-ionic fluorosurfactant (e.g., CAPSTONE® fluorosurfactants from DuPont, previously known as ZONYL FSO, POLYFOX™ PF-154N from Omnova Solutions Inc.), non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company), a water-soluble non-ionic surfactant (e.g., TERGITOL® TMN-6), and combinations thereof. Examples of anionic dispersants include those in the DOWFAX™ family (from Dow Chemical Company), and examples of cationic dispersants include dodecyltrimethylammonium chloride and hexadecyldimethylammonium chloride. Combinations of any of the previously listed dispersants may also be used.

The ink(s) may additionally include an anti-kogation agent, a biocide, an acrylic latex binder, and combinations thereof. Examples of anti-kogation agents include oleth-3-phosphate or polyoxyethyene (3) oleyl mono/di-phosphate (e.g., CRODAFOS® N-3A from Croda, now CRODAFOS® 03A), aqueous dispersion of fumed alumina or fumed silica (e.g., CAB-O-SPERSE® from Cabot Corp.), a metal chelator/chelating agent, such as methylglycinediacetic acid (e.g., TRILON® M from BASF Corp.), and combinations thereof. Examples of biocides include 1,2 benzisothiazolin-3-one as the active ingredient in ACTICIDE® B-20 (available from Thor GmbH), 2-methyl-4-isothiazolin-3-one as the active ingredient in ACTICIDE® M-20 (available from Thor GmbH), an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), an aqueous solution of methylisothiazolone (e.g., KORDEK® MLX from The Dow Chemical Co.), and combinations thereof. Examples of the acrylic latex binder include a copolymer of any two or more of styrene, acrylic acid, methacrylic acid, methyl methacrylate, ethyl methacrylate, and butyl methacrylate.

When included, the anti-kogation agent may be present in the ink(s) in an amount ranging from about 0.10 wt % to about 1 wt %, the biocide may be present in an amount ranging from about 0.01 wt % to about 0.40 wt %, and the acrylic latex binder may be present in an amount ranging from about 2 wt % to about 10 wt %, each of which is with respect to the total weight of the ink(s).

The ink(s) may also include a binder or other additives, such as a humectant and lubricant (e.g., LIPONIC® EG-1

(LEG-1) from Lipo Chemicals), a chelating agent (e.g., disodium ethylenediaminetetraacetic acid (EDTA-Na)), and/or a buffer.

An example of the ink(s) may include from about 1 wt % to about 10 wt % of pigment(s), from about 10 wt % to about 30 wt % of co-solvent(s), from about 0.5 wt % to about 2 wt % of dispersant(s), from 0.01 wt % to about 1 wt % of anti-kogation agent(s), from about 0.1 wt % to about 5 wt % of binder(s), from about 0.05 wt % to about 0.1 wt % biocide(s), and a balance of water.

An example of a dye based ink may include from about 1 wt % to about 7 wt % of dye(s), from about 10 wt % to about 30 wt % of co-solvent(s), from about 0.25 wt % to about 2 wt % of dispersant(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

Ink(s) Preparation

In some examples, the nanoparticle aqueous ink composition may be prepared by mixing the nanoparticles described above, a co-solvent, a balance of water. With water included, the nanoparticle aqueous ink composition may be adjusted to a pH from about 8.0 to about 8.5 with potassium hydroxide (KOH), or another suitable base. The nanoparticles may be present in an amount of from about 0.01 wt % to about 30 wt % based on the total weight of the nanoparticle aqueous ink composition.

In some examples, a buffer solution can be added to the nanoparticle aqueous ink composition by mixing the buffer solution into the nanoparticle aqueous ink composition.

In some examples, the nanoparticle aqueous ink composition may be filtered to obtain the nanoparticle aqueous ink composition used in the 3D printing methods described herein.

In some examples, the colored ink(s) may be prepared by first milling any colorant(s) in water and a dispersant additive until a particle size of from about 0.01 nm to about 1000 nm of the colorant is obtained. Milling forms a colorant concentrate.

A balance of water may be added in a suitable amount, taking into account the weight percent of colorant concentrate that is to be added. With water included, the ink vehicle may be adjusted to a pH from about 8.0 to about 8.5 with potassium hydroxide (KOH), or another suitable base. The colorant concentrate may be added (e.g., drop-wise) to the ink vehicle until the colorant is present in an amount of from about 0.01 wt % to about 30 wt % based on the total weight of the colored ink composition.

The ink vehicle may be mixed as the colorant concentrate is added thereto. Once the colorant and the ink vehicle are fully mixed, the pH of the mixture may be adjusted to about 8.5-9.5 with potassium hydroxide or another water soluble base. The mixture may be filtered to obtain the colored ink(s) used in the 3D printing methods disclosed herein.

In some examples, the at least one metal oxide can be encapsulated with the bilayer-forming surfactant before using the formed nanoparticles in inks. For example, the metal oxide can be mixed with the bilayer-forming surfactant in water in a ratio of, for example, about 1 weight part of pigment:about 1 weight part of the bilayer-forming surfactant:about 8 parts of water. After swelling of the bilayer-forming surfactant (interchangeably referred to as Encapsulant(s) herein) for about 2 hours, the bilayer-forming surfactant is dispersed in the system by applying high shear mixing conditions, e.g., using an IKA T-25 Ultra Turrax mixer at the speed of about 10,000 rpm for about 30 min. The dispersion is then subjected to microfluidization with a M110F Microfluidizer (Microfluidics), for 3 passes, for about 30 minutes to obtain an encapsulated nanoparticle dispersion. After microfluidization, other ink components such as solvent(s), surfactant(s), buffer solution(s), and biocide(s) can be added to the encapsulated nanoparticle dispersion. In an example, these ink components can be added at the same time as the metal oxide and the bilayer-forming surfactant(s) in water.

In some examples, after high shear and then the microfluidization described above, the bilayer-forming surfactant can be dispersed into small particles and without wishing to be bound by theory can at least partially wrap around the metal oxide particles. In some examples, the dispersion can transform from turbid to clear-opalescent after high shear and microfluidization.

In some examples, the metal oxide can be mixed with the bilayer-forming surfactant in water in a ratio of, for example, pigment:bilayer-forming surfactant:water of from about 0.1:0.1:9.8 parts by weight to about 3:5:2 parts by weight.

Method(s) of Using Nanoparticle(s)

In some examples, a method of using a nanoparticle can be described. The method of using the nanoparticle can comprise adding the nanoparticle described herein to an aqueous ink composition.

The adding of the nanoparticles described herein can include mixing, grinding, milling, and combinations thereof to form a substantially homogeneous mixture of the nanoparticles in the aqueous ink composition(s) or ink(s) described above.

In some examples, the method of using the nanoparticle can also comprise jetting the aqueous ink composition comprising the nanoparticle described herein to form a three-dimensional object(s) or part(s).

In some examples, jetting the aqueous ink composition to form three-dimensional object(s) or part(s) can include:
(i) applying a build material;
(ii) pre-heating the build material to a temperature ranging from about 50° C. to about 400° C.;
(iii) selectively applying the encapsulated infrared nanoparticle on at least a portion of the build material;
(iv) selectively applying a colored ink on at least a portion of the build material;
(v) exposing the build material, the applied encapsulated infrared nanoparticle, and the applied colored ink (in some instances) to infrared radiation to form the three-dimensional object(s) or part(s) by fusing the build material, the applied encapsulated infrared nanoparticle, and the applied colored ink (in some instances): and
(vi) repeating (i), (ii), (iii), (iv) and/or (v).

Build Material

The build material can be a powder, a liquid, a paste, or a gel. Examples of build material can include semi-crystalline thermoplastic materials with a wide processing window of greater than 5° C. (e.g., the temperature range between the melting point and the re-crystallization temperature). Some specific examples of the build material can include polyamides (PAs) (e.g., PA 11/nylon 11, PA 12/nylon 12, PA 6/nylon 6, PA 8/nylon 8, PA 91 nylon 9, PA 6,6/nylon 6,6, PA 612/nylon 6,12, PA 8,12/nylon 8,12, PA 9,12/nylon 9,12, or combinations thereof). Other specific examples of the build material can include polyethylene, polyethylene terephthalate (PET), and an amorphous variation of these materials. Still other examples of suitable build materials can include polystyrene, polyacetals, polypropylene, polycarbonate, polyester, thermal polyurethanes, other engineering plastics, and blends of any two or more of the polymers listed herein. Core shell polymer particles of these materials may also be used.

The build material can have a melting point ranging from about 50° C. to about 400° C. As examples, the build material may be a polyamide having a melting point of 180° C., or thermal polyurethanes having a melting point ranging from about 100° C. to about 165' C.

The build material can be made up of similarly sized particles or differently sized particles. In some examples, the build material can include particles of two different sizes. The term "size," as used herein with regard to the build material, refers to the diameter of a spherical particle, or the average diameter of a non-spherical particle (e.g., the average of multiple diameters across the particle).

In an example, the average size of the particles of the build material can ranges from about 0.1 µm to about 100 µm, or from about 1 µm to about 80 µm, or from about 5 µm to about 50 µm.

Build Material Additives

In some examples, the build material can include, in addition to polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.).

In an example, the charging agent is added in an amount ranging from greater than 0 wt % to less than 5 wt % based upon the total weight of the build material.

Flow aid(s) can be added to improve the coating flowability of the build material. Flow aid(s) may be particularly beneficial when the particles of the build material are less than 25 µm in size. The flow aid can improve the flowability of the build material by reducing the friction, the lateral drag, and the tribocharge buildup (by increasing the particle conductivity). Examples of flow aids can include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminium silicate (E559), stearic acid (E570), or polydimethylsiloxane (E900).

In an example, the flow aid can be added in an amount ranging from greater than 0 wt % to less than 5 wt % based upon the total weight of the build material.

Jetting Method(s)

In some examples, layer(s) of the build material can be applied in a fabrication bed of a 3D printer. The applied layer(s) can be exposed to heating, which can be performed to pre-heat the build material. Thus, the heating temperature may be below the melting point of the build material. As such, the temperature selected can depend upon the build material that is used. As examples, the heating temperature may be from about 5° C. to about 50° C. below the melting point of the build material. In an example, the heating temperature can range from about 50° C. to about 400° C. in another example, the heating temperature can range from about 150° C. to about 170° C.

Pre-heating the layer(s) of the build material may be accomplished using any suitable heat source that exposes all of the build material to the heat. Examples of the heat source can include a thermal heat source or an electromagnetic radiation source (e.g., infrared (IR), microwave, or combination thereof).

After pre-heating the layer(s) of the build material, the nanoparticles described herein can be selectively applied on at least a portion of the build material in the layer(s).

The nanoparticles described herein can be dispensed from an inkjet printhead, such as a thermal inkjet printhead or a piezoelectric inkjet printhead. The printhead can be a drop-on-demand printhead or a continuous drop printhead.

The printhead may include an array of nozzles through which drops of an aqueous ink composition comprising the nanoparticles described herein can be selected ejected. In some examples, printhead can deliver variable size drops of the aqueous ink composition comprising the nanoparticles described herein.

Before or after selectively applying the nanoparticle aqueous ink composition described herein on the portion(s) of the build material, other colored ink(s) can be applied to portion(s) of the build material.

After the nanoparticle aqueous ink composition and in some instances the colored ink(s) are selectively applied in the specific portions of the layer(s) of the build material, the entire object(s) or part(s) is exposed to infrared radiation.

The infrared radiation can be emitted from a radiation source, such as an IR (e.g., near-IR) curing lamp, or IR (e.g., near-IR) light emitting diodes (LED), or lasers with specific IR or near-IR wavelengths. Any radiation source may be used that emits a wavelength in the infrared spectrum, for example near-infrared spectrum. The radiation source may be attached, for example, to a carriage that also holds the printhead(s). The carriage may move the radiation source into a position that is adjacent to the fabrication bed containing the 3D printed object(s) or part(s). The radiation source may be programmed to receive commands from a central processing unit and to expose the layer(s) of the build material including the inks to the infrared radiation.

The length of time the radiation is applied for, or energy exposure time, may be dependent, for example, on characteristics of the radiation source, characteristics of the build material, and/or characteristics of the ink(s).

The nanoparticle aqueous ink composition described herein can enhance the absorption of the radiation, convert the absorbed radiation to thermal energy, and promote the transfer of the thermal heat to the build material in contact therewith. In an example, the ink can sufficiently elevate the temperature of the build material above the melting point(s), allowing curing (e.g., sintering, binding, or fusing) of the build material particles to take place.

In some examples, portions of the build material that do not have the ink applied thereto do not absorb enough energy to fuse. However, the generated thermal energy may propagate into the surrounding build material that does not have the ink applied thereto. The propagation of thermal energy may cause at least some of the build material sans ink to partially fuse.

Exposure to radiation can complete the formation of the 3D printed object(s) or part(s).

In some examples, the completed 3D printed object(s) or part(s) may be removed from the fabrication bed and any uncured build material may be removed from the 3D part(s) or object(s).

In some examples, the uncured build material ay be washed and then reused.

Method(s) for Adding Encapsulated Infrared Nanoparticles to 3D Object(s)/Part(s)

In some examples, a method for adding an encapsulated infrared nanoparticle to a three-dimensional object(s) or part(s) during three-dimensional printing can comprise:
(i) applying a build material;
(ii) pre-heating the build material to a temperature ranging from about 50° C. to about 400° C.;
(iii) selectively applying the encapsulated infrared nanoparticle on at least a portion of the build material;
(iv) selectively applying a colored ink on at least a portion of the build material;
(v) exposing the build material, the applied encapsulated infrared nanoparticle, and the applied colored ink (in some instances) to infrared radiation to form the three-dimensional object(s) or part(s) by fusing the build material, the applied encapsulated infrared nanoparticle, and the applied colored ink (in some instances); and
(vi) repeating (i), (ii), (iii). (iv) and/or (v).

In some examples, a 3D printing system for forming the 3D object(s) or part(s) can include a supply bed (including a supply of the build material described above), a delivery piston, a roller, a fabrication bed (having a contact surface), and a fabrication piston. Each of these physical elements may be operatively connected to a central processing unit of the 3D printing system. The central processing unit (e.g., running computer readable instructions stored on a non-transitory, tangible computer readable storage medium) can manipulate and transform data represented as physical (electronic) quantities within the printer's registers and memories in order to control the physical elements to create the 3D object(s) or part(s). The data for the selective delivery of the build material described above and the fusing agent (e.g., nanoparticles) described above may be derived from a model of the 3D object(s) or part(s) to be formed.

The delivery piston and the fabrication piston may be the same type of piston, but are programmed to move in opposite directions. In an example, when a first layer of the 3D object(s) or part(s) is to be formed, the delivery piston may be programmed to push a predetermined amount of the build material out of the opening in the supply bed and the fabrication piston may be programmed to move in the opposite direction of the delivery piston in order to increase the depth of the fabrication bed. The delivery piston can advance enough so that when the roller pushes the build material into the fabrication bed and onto the contact surface, the depth of the fabrication bed is sufficient so that a layer of the build material may be formed in the bed. The roller 20 can be capable of spreading the build material into the fabrication bed to form the layer, which is relatively uniform in thickness. In an example, the thickness of the layer can range from about 1 µm to about 1000 µm, although thinner or thicker layers may also be used.

In some examples, the roller can be replaced by other tools, such as a blade that may be used for spreading different types of powders, or a combination of a roller and a blade.

After the layer of the build material is deposited in the fabrication bed, the layer can be exposed to heating. Heating can be performed to pre-heat the build material, and thus a heating temperature below the melting point of the build material can be useful. As such, the temperature selected can depend upon the build material that is used. As examples, the heating temperature may be from about 5° C. to about 50° C. below the melting point of the build material. In an example, the heating temperature can range from about 50° C. to about 400° C. In another example, the heating temperature can range from about 150° C. to about 170° C.

Pre-heating the layer of the build material may be accomplished using any suitable heat source that exposes all of the build material in the fabrication bed to the heat. Examples of the heat source include a thermal heat source or an electromagnetic radiation source (e.g., infrared (IR), microwave, or combinations thereof).

After pre-heating the layer, the fusing agent (e.g., nanoparticle) can be selectively applied on a portion of the build material in the layer. The fusing agent may be dispensed from an inkjet printhead. One or multiple printheads may be used that span the width of the fabrication bed. The printhead may be attached to a moving XY stage or a translational carriage that moves the printhead adjacent to the fabrication bed in order to deposit the fusing agent in targeted area(s).

The printhead may be programmed to receive commands from the central processing unit and to deposit the fusing agent according to a pattern of a cross-section for the layer of the 3D object(s) or part(s) that is to be formed. As used herein, the cross-section of the layer of the object(s) or part(s) to be formed refers to the cross-section that is parallel to the contact surface.

In an example, the printhead can selectively apply the fusing agent on those portion(s) of the layer that are to be fused to become the first layer of the 3D object(s) or part(s). As an example, if the first layer is to be shaped like a cube or cylinder, the fusing agent can be deposited in a square pattern or a circular pattern, respectively, on at least a portion of the layer of the build material.

Examples of fusing agents include water-based dispersions having a radiation absorbing binding agent (e.g., an active material). The active material may be a near infrared light absorber.

In the examples described herein, the active material is the inorganic metal oxide described hereinabove. In some examples, the dye or pigment in the fusing agent can include any color in addition to the inorganic metal oxide described hereinabove.

The aqueous nature of the fusing agent can allow the fusing agent to penetrate, at least partially, into the layer of the build material. The build material may be hydrophobic, and the presence of a co-solvent and/or a surfactant in the fusing agent may assist in obtaining wetting behavior.

It is to be understood that a single fusing agent may be selectively applied to form the layer of the 3D object(s) or part(s), or multiple fusing agents may be selectively applied to form the layer of the 3D object(s) or part(s).

After the fusing agent is/are selectively applied on the targeted portion(s), a detailing agent may be selectively applied on the same and/or on different portion(s) of the build material. The detailing agent can include a colorant, a surfactant, a co-solvent, and a balance of water. In some examples, the detailing agent can include these components, and no other components. In some instances, the detailing agent can exclude specific components, such as additional colorants (e.g., pigment(s)). In some other examples, the detailing agent can further include an anti-kogation agent, a biocide, or combinations thereof. The detailing agent can prevent or reduce cosmetic defects (e.g., color and white patterns) by adding the colorant, which diffuses into and dyes the build material particles at least at the edge boundary.

The colorant in the detailing agent may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye can also be capable of absorbing radiation with wavelengths of 650 nm or less. As such, the dye in the detailing agent can absorb at least some wavelengths within the visible spectrum, but absorb little or no wavelengths within the near-infrared spectra. This is in contrast to the active material in the fusing agent, which can absorbs wavelengths within the near-infrared spectra. As such, the colorant in the detailing agent may not substantially absorb the fusing radiation, and thus may not initiate melting and fusing of the build material in contact therewith when the layer is exposed to the fusing radiation.

The dye selected as the colorant in the detailing agent can also have a high diffusivity (e.g., penetrates into greater than 10 μm and up to 100 μm of the build material particle). The high diffusivity can allow the dye to penetrate into the build material particles upon which the detailing agent can be applied, and also enable the dye to spread into portions/areas of the build material that are adjacent to the portions/areas of the build material upon which the detailing agent is applied. The dye can penetrates into the build material particles to dye/color the particles. When the detailing agent is applied at or just outside the edge boundary, the build material particles at the edge boundary may be colored. At least some of these dyed build material particles can be present at the edge(s) or surface(s) of the formed 3D layer or object(s)/part(s), which can prevent or reduce any patterns from forming at the edge(s) or surface(s).

The above 3D printing stages can be repeated in different orders to obtain the 3D printed object(s) or part(s).

In some examples, the detailing agent described above can be the same as the colored ink(s) described above.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are provided for illustrative reasons and are not to be construed as limiting the scope of the present disclosure.

EXAMPLES

Example 1—Formulations

Ink Formulations 1-19 and Control were prepared as shown in Tables 1-4 below.

TABLE 1

| Components | Formulation 1 (wt %) | Formulation 2 (wt %) | Formulation 3 (wt %) | Formulation 4 (wt %) |
| --- | --- | --- | --- | --- |
| $Cs_{0.33}WO_3$ | 8 | 8 | 1 | 0.1 |
| Soy Phospholipid (source 1) | 8 | — | 8 | 8 |
| Soy Phospholipid (source 2) | — | 8 | — | — |
| 2-Hydroxyethyl Pyrrolidinone | 20 | 20 | 20 | 20 |
| SURFYNOL ® SEF | 0.75 | 0.75 | 0.75 | 0.75 |
| CAPSTONE ® FS-35 | 0.05 | 0.05 | 0.05 | 0.05 |
| CRODAFOS ® O3A | 0.5 | 0.5 | 0.5 | 0.5 |
| CAB-O-SPERSE ® K 7028 | 0.01 | 0.01 | 0.01 | 0.01 |
| TRILON ® M | 0.04 | 0.04 | 0.04 | 0.04 |
| PROXEL ® GXL | 0.18 | 0.18 | 0.18 | 0.18 |
| KORDEK ® MLX | 0.14 | 0.14 | 0.14 | 0.14 |
| Water | Balance | Balance | Balance | Balance |

TABLE 2

| Components | Formulation 5 (wt %) | Formulation 6 (wt %) | Formulation 7 (wt %) | Formulation 8 (wt %) | Formulation 9 (wt %) |
|---|---|---|---|---|---|
| Solvent(s) | | | | | |
| 2-pyrrolidone | 19 | 19 | 19 | 19 | — |
| Hydroxyethyl-2-Pyrrolidone | — | — | — | — | 19 |
| Diethylene Glycol | — | — | — | — | — |
| Pigment(s) | | | | | |
| $Cs_{0.33}WO_3$ | 8 | 4 | 8 | 4 | 8 |
| Encapsulant(s) | | | | | |
| Soy Phospholipid | 8 | 4 | 8 | 4 | 8 |
| HOSTAPHAT ® 1322 | — | — | — | — | — |
| ZELEC ® NK | — | — | — | — | — |
| Biocide(s) | | | | | |
| ACTICIDE ® B-20 | — | — | — | 0.036 | — |
| ACTICIDE ® M-20 | — | — | — | 0.014 | — |
| Buffer(s) | | | | | |
| TRIZMA ® | — | — | 0.1 | 0.1 | — |
| Beta Alanine | — | — | — | — | — |
| Betaine | — | — | — | — | — |
| Dispersant(s) | | | | | |
| TERGITOL ® 15-S-30 | — | — | — | — | — |
| Water | Balance | Balance | Balance | Balance | Balance |

TABLE 3

| Components | Formulation 10 (wt %) | Formulation 11 (wt %) | Formulation 12 (wt %) | Formulation 13 (wt %) | Formulation 14 (wt %) |
|---|---|---|---|---|---|
| Solvents(s) | | | | | |
| 2-pyrrolidone | — | — | — | — | — |
| Hydroxyethyl-2-Pyrrolidone | — | 19 | — | — | — |
| Diethylene Glycol | 19 | — | 19 | 20 | 20 |
| Pigment(s) | | | | | |
| $Cs_{0.33}WO_3$ | 8 | 8 | 8 | 0.1 | 8 |
| Encapsulant(s) | | | | | |
| Soy Phospholipid | 8 | 8 | 8 | — | — |
| HOSTAPHAT ® 1322 | — | — | — | 8 | 8 |
| ZELEC ® NK | — | — | — | — | — |
| Biocide(s) | | | | | |
| ACTICIDE ® B-20 | — | — | — | — | — |
| ACTICIDE ® M-20 | — | — | — | — | — |
| Buffer(s) | | | | | |
| TRIZMA ® | — | — | — | — | — |
| Beta Alanine | — | 8 | 8 | — | — |
| Betaine | — | — | — | — | — |
| Dispersant(s) | | | | | |
| TERGITOL ® 15-S-30 | — | — | — | — | — |
| Water | Balance | Balance | Balance | Balance | Balance |

TABLE 4

| Components | Formulation 15 (wt %) | Formulation 16 (wt %) | Formulation 17 (wt %) | Formulation 18 (wt %) | Formulation 19 (wt %) | Control (wt %) |
|---|---|---|---|---|---|---|
| Solvent(s) | | | | | | |
| 2-pyrrolidone | — | 20 | 20 | 20 | 20 | 25 |
| Hydroxyethyl-2-Pyrrolidone | 20 | — | — | — | — | — |
| Diethylene Glycol | — | — | — | — | — | — |

TABLE 4-continued

| Components | Formulation 15 (wt %) | Formulation 16 (wt %) | Formulation 17 (wt %) | Formulation 18 (wt %) | Formulation 19 (wt %) | Control (wt %) |
|---|---|---|---|---|---|---|
| Pigment(s) | | | | | | |
| $Cs_{0.33}WO_3$ | 8 | 8 | 8 | 8 | 8 | 8 |
| Encapsulant(s) | | | | | | |
| Soy Phospholipid | — | — | 8 | — | — | — |
| HOSTAPHAT ® 1322 | 8 | 4 | — | — | — | — |
| ZELEC ® NK | — | — | — | 4 | 2 | — |
| Biocide(s) | | | | | | |
| ACTICIDE ® B-20 | — | — | — | — | — | — |
| ACTICIDE ® M-20 | — | — | — | — | — | — |
| Buffer(s) | | | | | | |
| TRIZMA ® | — | — | — | — | — | — |
| Beta Alanine | — | — | 8 | — | — | — |
| Betaine | — | — | — | — | — | 1 |
| Dispersant(s) | | | | | | |
| TERGITOL ® 15-S-30 | — | — | — | — | — | 0.2 |
| Water | Balance | Balance | Balance | Balance | Balance | Balance |

Example 2—Absorbance

Accelerated shelf life (ASL) storage was measured at 60° C. by measuring absorbance of Formulations 7-9, 11, 13, and Control using near infrared at 1000 nm over a period of 6 weeks. IR Absorbance was measured by using Fourier transform infrared spectrometer and test method ASTM E2937.

It was found that Formulations 7-9, 11, and 13 maintained good absorbance over a period of 6 weeks as shown in FIG. 1. In contrast, the Control formulation showed a significant reduction in absorbance over a period of 6 weeks as shown in FIG. 1.

Example 3—Particle Size

Accelerated shelf life storage was measured at 60° C. by measuring particle sizes of Formulations 7-9, 11, 13, and Control using near infrared at 1000 nm over a period of 6 weeks. Particle sizes were measured by using a laser diffractometer and test method ASTM D4464.

Figure 2:
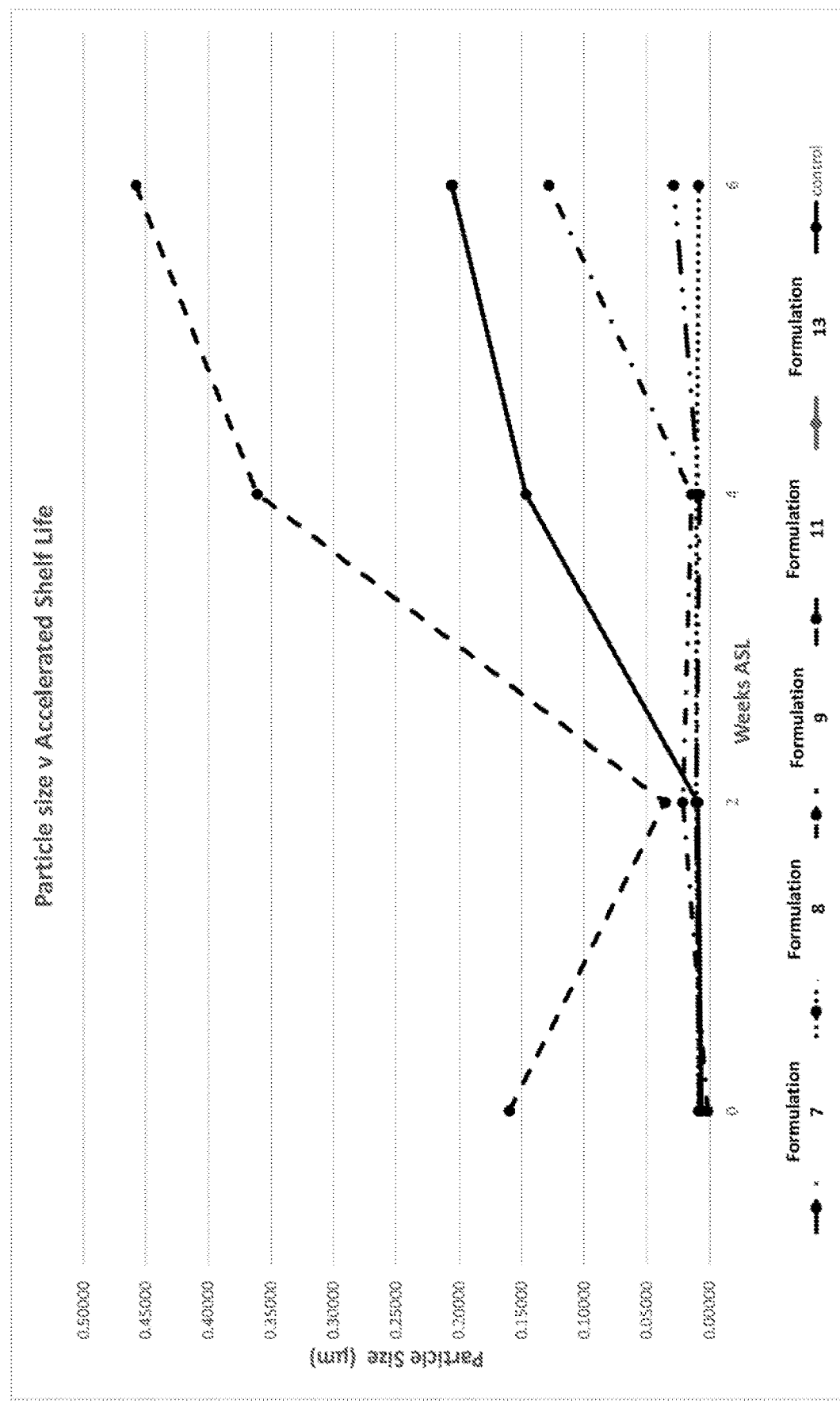
FIG. 2 is a graph showing particle size changes over a period of 6 weeks (ASL) for six different formulations.

It was found that Formulations 7-9, 11, and 13 maintained good particle size stability over a period of 6 weeks as shown in FIG. 2. In contrast, the Control formulation showed a significant increase in particle size over a period of 6 weeks as shown in FIG. 2.

Example 4—Phase Stability

As shown in Table 5 below, the formulations containing an encapsulant and a buffer in conjunction with the IR absorbing pigment particle, showed no phase separation upon visual inspection, particle size stability (using a laser diffractometer and test method ASTM D4464), and absorbance stability (using Fourier transform infrared spectrometer and test method ASTM E2937) over time—e.g., Formulations 7, 8, 11, and 15-17.

TABLE 5

| Formulation | Encapsulant(s) | Buffer(s) | D(t)/(D0) absorbance decrease, 2 weeks* | MV D(2 weeks)/ D(0 weeks)* | D(t)/(D0) absorbance decrease, 6 weeks* | MV D(6 weeks)/ D(0 weeks)* |
|---|---|---|---|---|---|---|
| Formulation 5 | Soy Phospholipid | None | 0.93 | 1.44 | phase separation | phase separation |
| Formulation 6 | Soy Phospholipid | None | 0.95 | 1.47 | phase separation | phase separation |
| Formulation 7 | Soy Phospholipid | TRIZMA ® | 0.96 | 1.31 | 0.63 | 3.5 |
| Formulation 8 | Soy Phospholipid | TRIZMA ® | 0.96 | 1.20 | 0.89 | 1.0 |
| Formulation 9 | Soy Phospholipid | None | 0.99 | 14.53 | 0.87 | 86.9 |
| Formulation 10 | Soy Phospholipid | None | phase separation | phase separation | phase separation | phase separation |
| Formulation 11 | Soy Phospholipid | beta-alanine | 1.01 | 0.2 | 1.00 | 2.9 |
| Formulation 12 | Soy Phospholipid | beta-alanine | phase separation | phase separation | phase separation | phase separation |

| Formulation | Encapsulant(s) | Buffer(s) | D(t)/(D0) abs decrease, 2 weeks* | MV D(2 weeks)/ D(0 weeks)* | D(t)/(D0) abs decrease, 6 weeks* | MV D(6 weeks)/ D(0 weeks)* |
|---|---|---|---|---|---|---|
| Formulation 13 | HOSTAPHAT ® 1322 | None | phase separation | phase separation | phase separation | phase separation |
| Formulation 14 | HOSTAPHAT ® 1322 | None | phase separation | phase separation | phase separation | phase separation |
| Formulation 15 | HOSTAPHAT ® 1322 | None | 0.98 | 0.81 | 0.65 | 0.88 |

TABLE 5-continued

| | | | | | | |
|---|---|---|---|---|---|---|
| Formulation 16 | HOSTAPHAT ® 1322 | None | 0.82 | 1.02 | phase separation | phase separation |
| Formulation 17 | Soy Phospholipid | beta-alanine | 0.81 | 1.35 | phase separation | phase separation |
| Formulation 18 | ZELEC ® NK | None | no data | no data | no data | no data |
| Formulation 19 | ZELEC ® NK | None | no data | no data | no data | no data |
| Control | none | None | 0.87 | 1.43 | 0.77 | 29.6 |

*1 = best, bigger is better
*1 = best, bigger is worse
*1 = best, bigger is better
*1 = best, bigger is worse In Table 5 above, "D(t)/(D0) absorbance decrease, 2 weeks" means the ratio of the ink optical density at the wavelength of 1000 nm, after dilution by 1000× (or 1000 times) w/w in water, after 2 weeks of exposure at 60° C. Similarly, "MV D(2 weeks)/D(0 weeks)" in Table 5 above means the ratio of weight-average diameter D MV, as determined by dynamic light scattering, after 2 weeks of exposure at 60° C., to that before the exposure. All optical density measurements were conducted with the 1-cm-wide cuvette.

Similarly, "D(t)/(D0) abs decrease, 6 weeks" and, "MV D(6 weeks)/D(0 weeks)" means the same as described hereinabove, but after 6 weeks of temperature exposure instead of 2 weeks.

The above examples show that the nanoparticles comprising IR absorbing metal oxides and bilayer-forming surfactant exhibited better particle size and absorbance stability over time when compared with nanoparticles comprising IR absorbing metal oxides sans bilayer-forming surfactants. The above examples further show that the nanoparticles comprising IR absorbing metal oxides, bilayer-forming surfactant, and a buffer solution exhibited better particle size and absorbance stability over time when compared with nanoparticles comprising IR absorbing metal oxides sans bilayer-forming surfactants and/or buffer solutions.

While several examples have been described in detail, it is to be understood that the disclosed examples may be modified. Therefore, the foregoing description is to be considered non-limiting.

What is claimed is:

1. A nanoparticle comprising:
at least one metal oxide, which absorbs infrared light in a range of from about 780 nm to about 2300 nm and is shown in formula (1):

$$M_mM'O_n \qquad (1)$$

wherein
M is an alkali metal,
m is greater than 0 and less than 1,
M' is any metal, and
n is greater than 0 and less than or equal to 4; and
a bilayer-forming surfactant encapsulating at least 55% of a core surface area of the metal oxide, wherein the bilayer-forming surfactant comprises at least one of a soy phospholipid or a phosphate ester, wherein the nanoparticle has a diameter of from about 0.1 nm to about 500 nm.

2. The nanoparticle of claim 1, wherein M is lithium (Li), sodium (Na), potassium (K), rubidium (Rb), cesium (Cs), or mixtures thereof.

3. The nanoparticle of claim 1, wherein M' is tungsten (W), molybdenum (Mo), tantalum (Ta), hafnium (Hf), cerium (Ce), lanthanum (La), or mixtures thereof.

4. The nanoparticle of claim 1, wherein
M is cesium (Cs),
m is 0.33,
M' is tungsten (W), and
n is greater than 0 and less than or equal to 3.

5. A method of using the nanoparticle of claim 1 comprising:
adding the nanoparticle of claim 1 to an aqueous ink composition.

6. An ink composition for three-dimensional printing, the ink composition comprising:
(A) water;
(B) at least one co-solvent; and
(C) an encapsulated nanoparticle comprising:
a core comprising at least one metal oxide, which absorbs infrared light in a range of from about 780 nm to about 2300 nm and is shown in formula (1):

$$M_mM'O_n \qquad (1)$$

wherein
M is an alkali metal,
m is greater than 0 and less than 1,
M' is any metal, and
n is greater than 0 and less than or equal to 4; and
a shell encapsulating at least 55% of a surface area of the core, wherein the shell comprises a bilayer-forming surfactant, wherein the bilayer-forming surfactant comprises at least one of a soy phospholipid or a phosphate ester, wherein the encapsulated nanoparticle has a diameter of from about 0.1 nm to about 500 nm.

7. The ink composition of claim 6, further comprising (D) at least one buffer solution.

8. The ink composition of claim 6, wherein the core comprising the at least one metal oxide shown in formula (1) is present in an amount of from about 1 wt % to about 15 wt % based on the total weight of the ink composition.

9. The ink composition of claim 6, wherein the shell comprising the bilayer-forming surfactant is present in an amount of from about 1 wt % to about 15 wt % based on the total weight of the ink composition.

10. The ink composition of claim 6, wherein
M is cesium (Cs),
m is 0.33,
M' is tungsten (W), and
n is greater than 0 and less than or equal to 3.

11. The ink composition of claim 7, wherein
M is cesium (Cs),
m is 0.33,
M' is tungsten (W), and
n is greater than 0 and less than or equal to 3.

* * * * *